US012353079B2

(12) United States Patent
Wang et al.

(10) Patent No.: US 12,353,079 B2
(45) Date of Patent: Jul. 8, 2025

(54) DISPLAY DEVICE

(71) Applicant: AmTRAN Technology Co., Ltd., New Taipei (TW)

(72) Inventors: Chih Kuei Wang, New Taipei (TW); Chih Chien Hung, New Taipei (TW); Yung Hsu Chen, New Taipei (TW); Hsuan-Jung Chang, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 352 days.

(21) Appl. No.: 18/297,635

(22) Filed: Apr. 9, 2023

(65) Prior Publication Data

US 2024/0272671 A1 Aug. 15, 2024

(30) Foreign Application Priority Data

Feb. 10, 2023 (TW) ................................. 112104879

(51) Int. Cl.
*G02F 1/1333* (2006.01)
*G06F 1/16* (2006.01)

(52) U.S. Cl.
CPC .. *G02F 1/133308* (2013.01); *G02F 1/133314* (2021.01); *G02F 1/133317* (2021.01); *G06F 1/1637* (2013.01)

(58) Field of Classification Search
CPC ......... G02F 1/133308; G02F 1/133314; G02F 1/133317; G02F 1/1336; G06F 1/1637
See application file for complete search history.

(56) References Cited

U.S. PATENT DOCUMENTS

| 6,611,302 | B1 * | 8/2003 | Ueda ................. G02F 1/133308 349/59 |
| 8,350,983 | B2 * | 1/2013 | Wang ................ G02F 1/133305 349/58 |
| 2011/0096569 | A1 * | 4/2011 | Hamada ............... G02B 6/0085 362/613 |
| 2013/0141665 | A1 * | 6/2013 | Huang .............. G02F 1/133608 349/60 |

(Continued)

FOREIGN PATENT DOCUMENTS

| CN | 216084134 U | 3/2022 | |
| CN | 113885255 B | * 12/2023 | ....... G02F 1/133608 |

(Continued)

*Primary Examiner* — Nidhi Thaker
(74) *Attorney, Agent, or Firm* — CKC & Partners Co., LLC

(57) ABSTRACT

A display device includes a backboard, a rubber frame and a display panel. A backboard includes a base and a wall having a first end and a second end opposite to the first end. The first end connects with an edge of the base. The rubber frame includes an abutting portion, a supporting portion and an extending portion. The abutting portion locates outside the backboard and abuts against the wall. The supporting portion connects with the abutting portion and is supported at the second end. The extending portion connects with the abutting portion and extends toward outside from the backboard. The extending portion and the supporting portion are at least partially coplanar to define a connecting surface. The display panel couples with the connecting surface. An edge of the extending portion substantially aligns with or exceeds relative to the wall an edge of the display panel.

11 Claims, 9 Drawing Sheets

(56) References Cited

U.S. PATENT DOCUMENTS

| | | | | |
|---|---|---|---|---|
| 2013/0250203 A1* | 9/2013 | Zhou | ............... | G02F 1/133608 |
| | | | | 362/624 |
| 2016/0306104 A1* | 10/2016 | Hsieh | ............... | G02B 6/0088 |
| 2024/0302688 A1* | 9/2024 | Xu | ............... | G02F 1/133603 |
| 2024/0345436 A1* | 10/2024 | Zhu | ............... | G02F 1/133608 |

FOREIGN PATENT DOCUMENTS

| | | | |
|---|---|---|---|
| TW | 200819877 A | 5/2008 |
| TW | 201314299 A | 4/2013 |
| TW | 201317682 A | 5/2013 |
| TW | 201506500 A | 2/2015 |

* cited by examiner

DISPLAY DEVICE

CROSS-REFERENCE TO RELATED APPLICATION

This application claims priority to Taiwan Application Serial Number 112104879, filed Feb. 10, 2023, which is herein incorporated by reference in its entirety.

BACKGROUND

Technical Field

The present disclosure relates to display devices.

Description of Related Art

With the improvement of living standards of people, the demand of people for computer equipment is also increasing. Facing to the huge market of computer equipment, in order to enhance the competitiveness of a brand, manufacturers are also working hard to improve the computer equipment.

However, apart from improving the performance and efficiency of computer equipment, how to improve the production yield of computer equipment in order to effectively reduce the production cost is undoubtedly an important issue which the industry highly concerns.

SUMMARY

A technical aspect of the present disclosure is to provide a display device, which can provide protection to its display panel, such that the display panel is avoided from being touched directly by workers, and the risk of the display panel to be directly collided is also reduced. In this way, the production yield of the display device is effectively improved.

According to an embodiment of the present disclosure, a display device includes a backboard, a rubber frame and a display panel. The backboard includes a base and a wall. The wall has a first end and a second end opposite to the first end. The first end is connected with an edge of the base. The rubber frame includes an abutting portion, a supporting portion and an extending portion. The abutting portion is located outside the backboard and abuts against the wall. The supporting portion is connected with the abutting portion and is supported at the second end. The extending portion is connected with the abutting portion and extends toward outside from the backboard. The extending portion and the supporting portion are at least partially coplanar to define a connecting surface. The display panel is coupled with the connecting surface. An edge of the extending portion substantially aligns with or exceeds relative to the wall an edge of the display panel.

In one or more embodiments of the present disclosure, the edge of the extending portion being away from the abutting portion has a first perpendicular distance relative to the wall. The edge of the display panel has a second perpendicular distance relative to the wall. The first perpendicular distance is longer than or equal to the second perpendicular distance.

In one or more embodiments of the present disclosure, the rubber frame further includes at least one stiffener. The stiffener is perpendicularly connected with the abutting portion and the extending portion.

In one or more embodiments of the present disclosure, the rubber frame further includes at least one first guiding portion and at least one second guiding portion. The first guiding portion is connected with the abutting portion and the extending portion. The first guiding portion has a first inclined surface. The second guiding portion is perpendicularly connected with the extending portion. The second guiding portion at least partially aligns with and is separated from the first guiding portion. The second guiding portion has a second inclined surface. The first inclined surface and the second inclined surface define together an opening therebetween. The display device further includes a rear casing. The rear casing includes a casing body and a third guiding portion connected with the casing body. The third guiding portion is configured to penetrate through the opening.

In one or more embodiments of the present disclosure, the display device further includes a connecting piece. The connecting piece is coupled between the connecting surface and the display panel.

In one or more embodiments of the present disclosure, the rubber frame further includes at least one first snapping portion. The first snapping portion is disposed at a side of the abutting portion away from the wall. The display device further includes a rear casing. The rear casing includes a casing body and a second snapping portion connected with the casing body. The backboard is located between the display panel and the casing body. The second snapping portion is configured to snap with the first snapping portion.

According to an embodiment of the present disclosure, a display device includes a display panel and a backlight module. The backlight module is coupled with the display panel. The backlight module has at least one extending portion extending towards an outside of the backlight module. An edge of the extending portion substantially aligns with or exceeds an edge of the display panel.

In one or more embodiments of the present disclosure, the display panel includes a main body and at least one touch cable. A quantity of the extending portion is plural. The backlight module further includes a backboard, a rubber frame and a plurality of optical films. The backboard includes a base and a wall. The wall has a first end and a second end opposite to the first end. The first end is connected with an edge of the base. The rubber frame includes an abutting portion, a supporting portion and a structural portion. The abutting portion is located outside the backboard and abuts against the wall. The supporting portion is connected with the abutting portion and is supported at the second end. The structural portion is connected with the supporting portion. The wall is at least partially located between the abutting portion and the structural portion. The extending portions are respectively connected with the abutting portion and extend toward outside from the backboard. The extending portions are separated from each other and define a first opening therebetween. The touch cable is coupled between the main body and the backboard through the first opening. Each of the extending portions and the supporting portion are at least partially coplanar to define a connecting surface. The display panel is coupled with the connecting surface. The optical films are at least partially stacked between the base and the structural portion.

In one or more embodiments of the present disclosure, the edge of each of the extending portions being away from a corresponding one of the abutting portions has a first perpendicular distance relative to the wall. The edge of the display panel has a second perpendicular distance relative to the wall. Each of the first perpendicular distances is longer than or equal to the second perpendicular distance.

In one or more embodiments of the present disclosure, the rubber frame further includes at least two first snapping portions. The first snapping portions are respectively disposed on a corresponding one of the extending portions. The touch cable is at least partially located between the first snapping portions. The backlight module further includes a protective cover. The protective cover includes a cover body and two second snapping portions. The second snapping portions are disposed at two opposite ends of the cover body for mutually snapping with a corresponding one of the first snapping portions.

In one or more embodiments of the present disclosure, the abutting portion includes at least one first subsidiary abutting portion and at least two second subsidiary abutting portions. The first subsidiary abutting portion is located between and separated from the second subsidiary abutting portions. The first subsidiary abutting portion has a second opening. The backboard further includes a third snapping portion. The third snapping portion is disposed on the wall for snapping at the second opening.

In one or more embodiments of the present disclosure, the backlight module further includes at least one locking piece. The locking piece is configured to penetrate through the wall and the abutting portion.

In one or more embodiments of the present disclosure, the locking piece is a combination of a screw and a nut.

The above-mentioned embodiments of the present disclosure have at least the following advantages: since the extending portion of the rubber frame extends toward outside from the backboard to an outside of the backboard and the edge of the extending portion substantially aligns with or exceeds relative to the wall the edge of the display panel, the extending portion can provide protection to the display panel. Thus, the display panel is avoided from being touched directly by workers, and the risk of the display panel to be directly collided is also reduced. In this way, the production yield of the display device is effectively improved.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
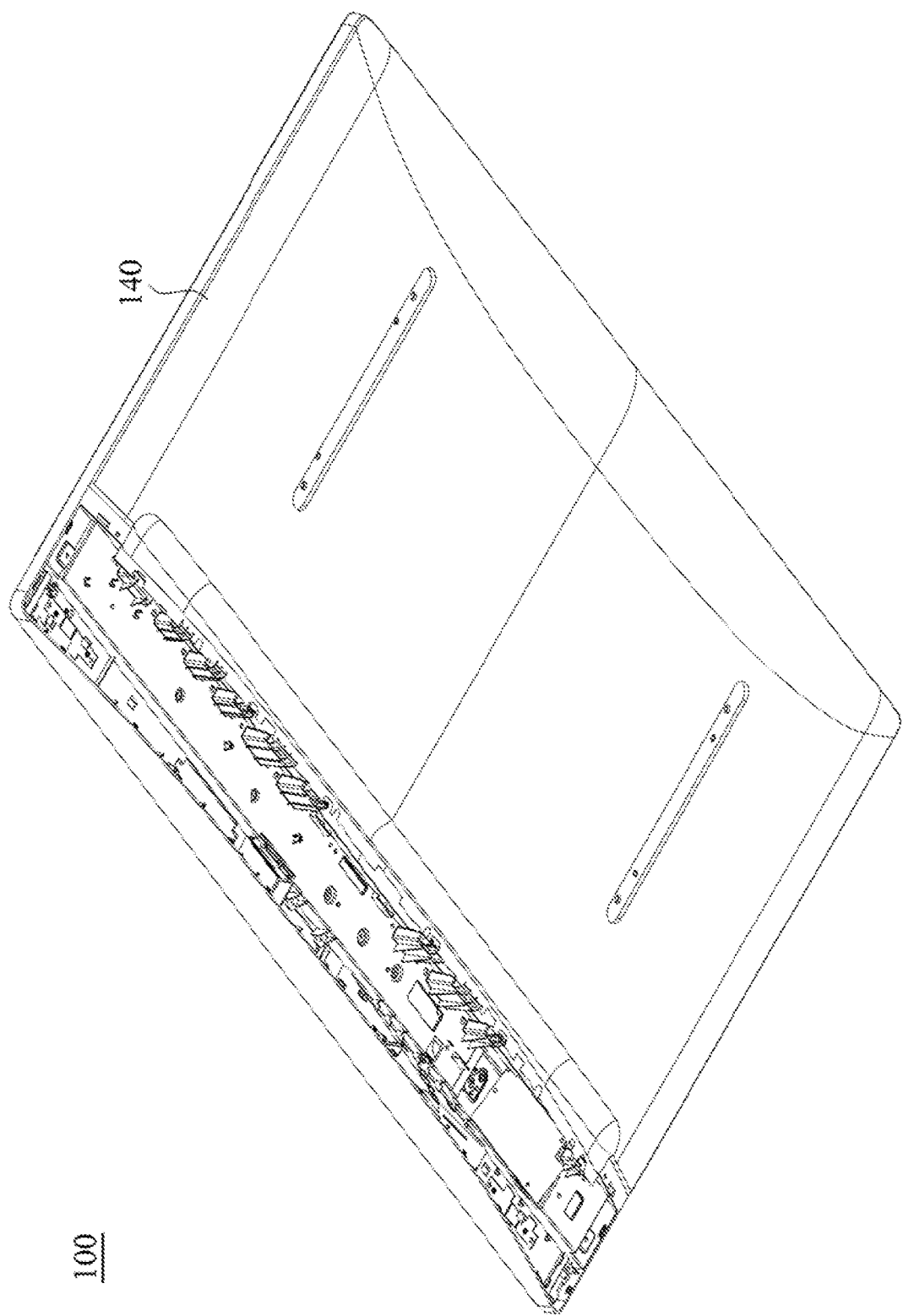
FIG. 1 is a schematic bottom view of a display device according to some embodiments of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
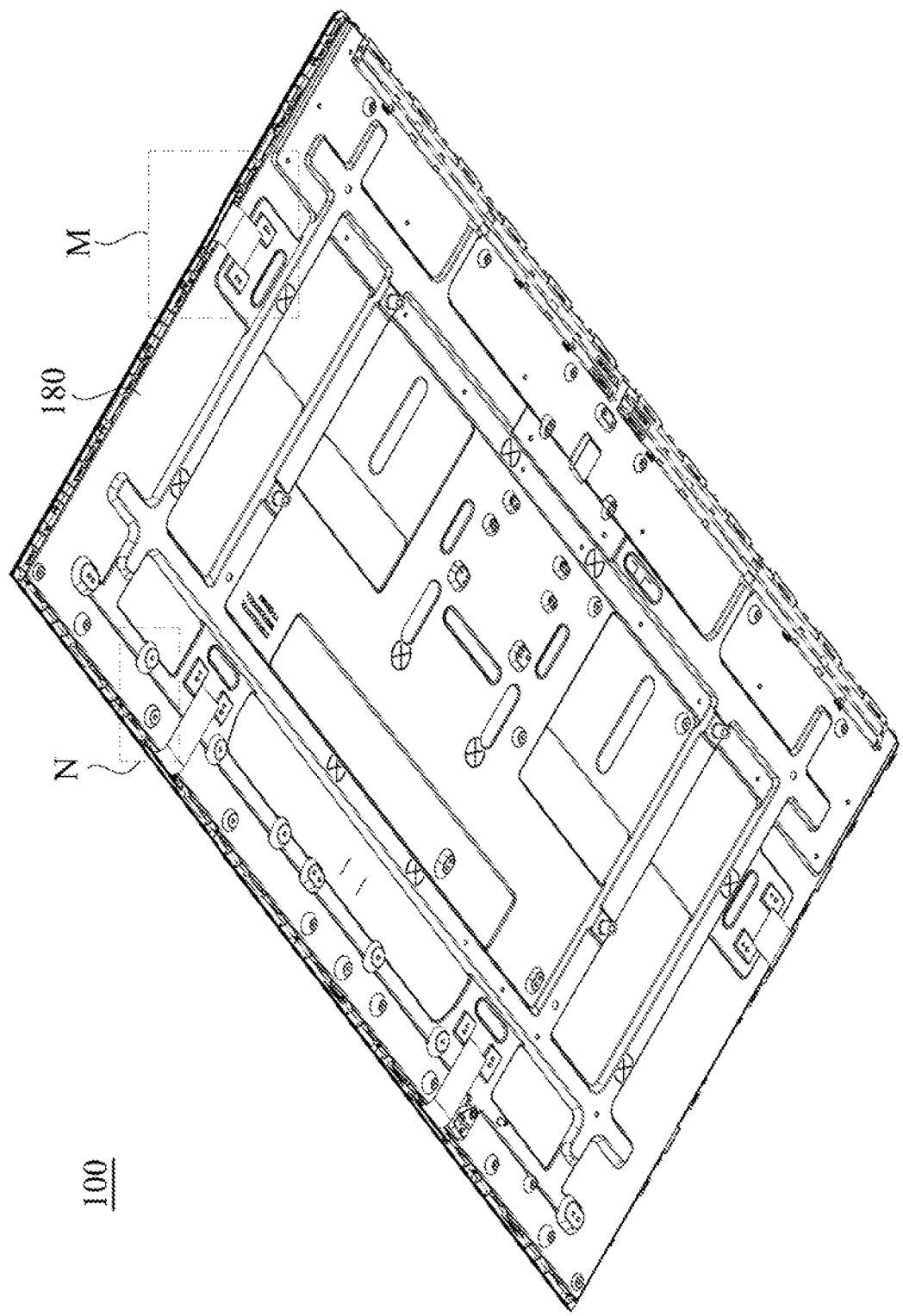
FIG. 2 is a schematic bottom view of the display device of FIG. 1, in which the rear casing is omitted.

Reference is made to FIGS. 1-2. FIG. 1 is a schematic bottom view of a display device 100 according to some embodiments of the present disclosure. FIG. 2 is a schematic bottom view of the display device 100 of FIG. 1, in which the rear casing 140 is omitted. In this embodiment, a display device 100 includes a backlight module 180 and a rear casing 140. As shown in FIG. 2, after the rear casing 140 (please see FIG. 1) is omitted, the display device 100 exposes the backlight module 180.

Figure 3:
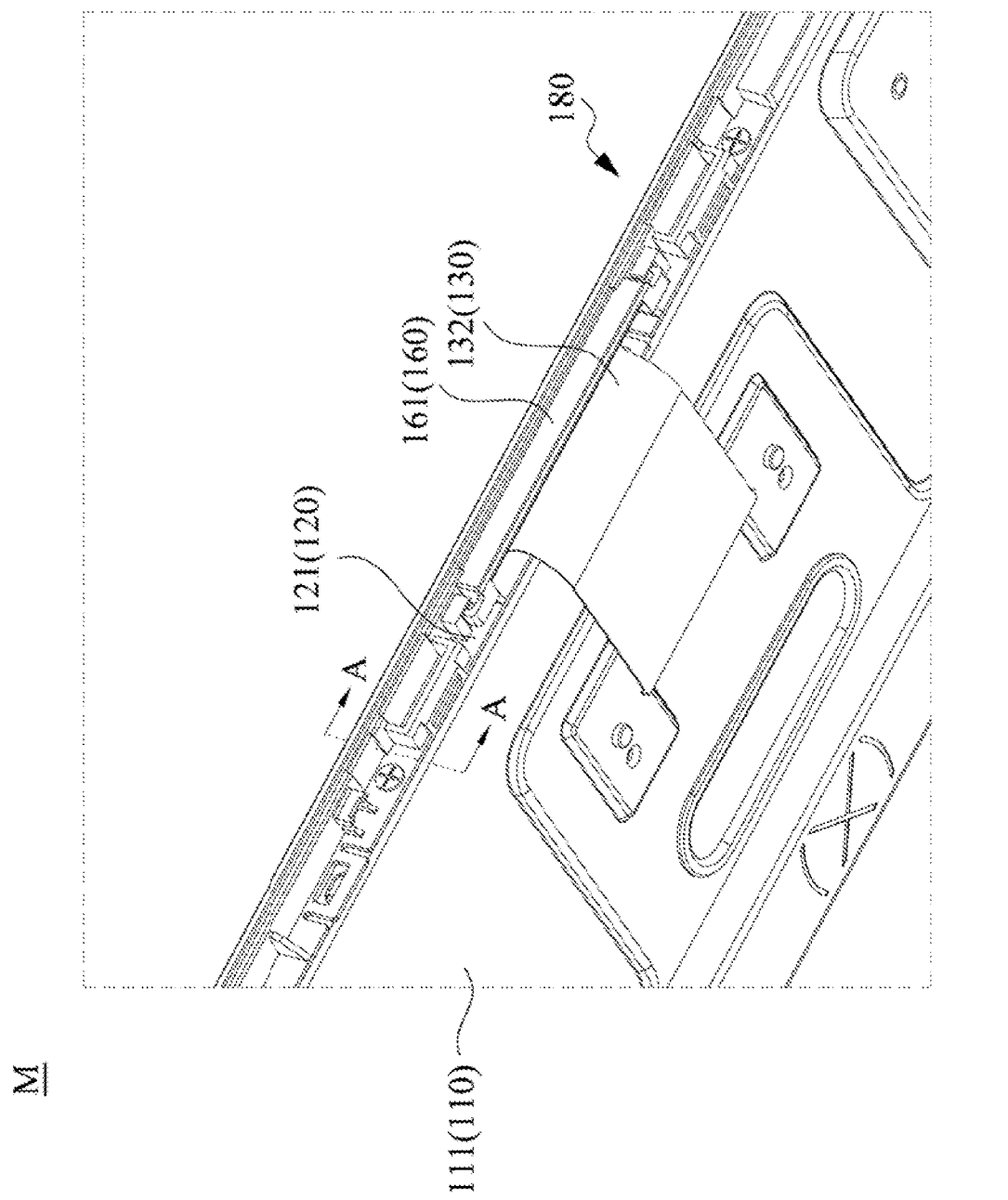
FIG. 3 is a regionally enlarged view of the zone M in FIG. 2.
Figure 4:
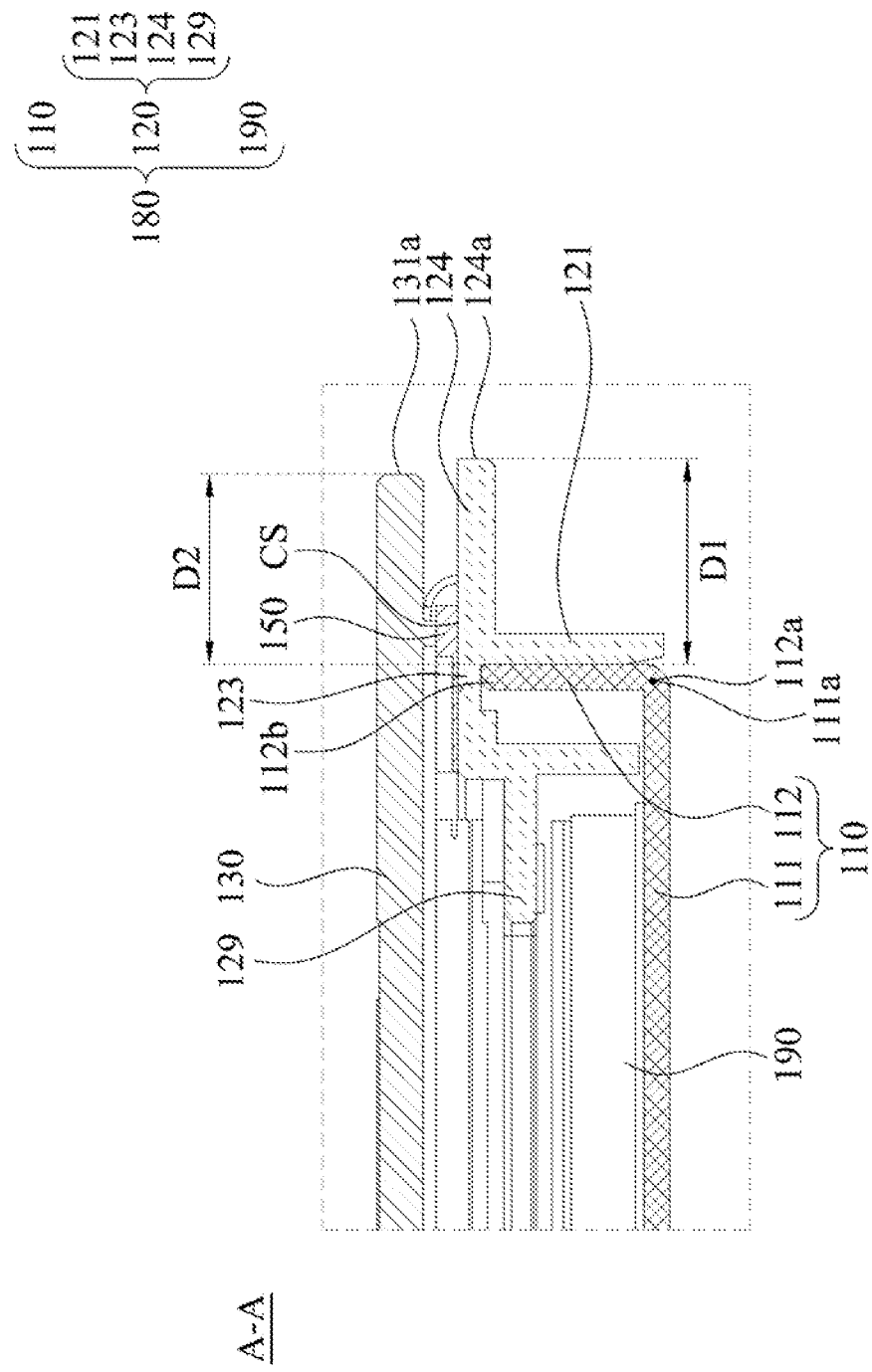
FIG. 4 is a sectional view along the sectional line A-A in FIG. 3.

Reference is made to FIGS. 3-4. FIG. 3 is a regionally enlarged view of the zone M in FIG. 2. FIG. 4 is a sectional view along the sectional line A-A in FIG. 3. In this embodiment, as shown in FIGS. 3-4, the display device 100 further includes a display panel 130. The backlight module 180 is coupled with the display panel 130. To be specific, the backlight module 180 further includes a backboard 110, a rubber frame 120 and a plurality of optical films 190. The backboard 110 includes a base 111 and a wall 112. The wall 112 has a first end 112a and a second end 112b opposite to the first end 112a. The first end 112a of the wall 112 is connected with an edge 111a of the base 111. The rubber frame 120 includes an abutting portion 121, a supporting portion 123 and an extending portion 124. The abutting portion 121 is located outside the backboard 110 and abuts against the wall 112. The supporting portion 123 is connected with the abutting portion 121 and is supported at the second end 112b of the wall 112. The extending portion 124 is connected with the abutting portion 121 and extends forward outside from the backboard 110 to an outside of the backboard 110. The extending portion 124 and the supporting portion 123 are at least partially coplanar to define a connecting surface CS. The display panel 130 is coupled with the connecting surface CS. It is worth to note that, in this embodiment, an edge 124a of the extending portion 124 substantially aligns with or exceeds relative to the wall 112 an edge 131a of the display panel 130.

Since the extending portion 124 of the rubber frame 120 extends toward outside from the backboard 110 to an outside of the backboard 110 and the edge 124a of the extending portion 124 substantially aligns with or exceeds relative to the wall 112 the edge 131a of the display panel 130, the extending portion 124 can provide protection to the display panel 130. Thus, the display panel 130 is avoided from being touched directly by workers, and the risk of the display panel 130 to be directly collided is also reduced. In this way, the production yield of the display device 100 is effectively improved.

Furthermore, as shown in FIG. 4, the edge 124*a* of the extending portion 124 being away from the abutting portion 121 has a first perpendicular distance D1 relative to the wall 112. On the other hand, the edge 131*a* of the display panel 130 has a second perpendicular distance D2 relative to the wall 112. In this embodiment, the first perpendicular distance D1 is longer than or equal to the second perpendicular distance D2. This means the edge 131*a* of the display panel 130 can be covered by the extending portion 124. Thus, the extending portion 124 can provide reliable protection to the display panel 130. In practice, the part of the display panel 130 covered by the extending portion 124 can be a glass substrate of the display panel 130.

Furthermore, in this embodiment, as shown in FIG. 4, the rubber frame 120 further includes a structural portion 129. The structural portion 129 is connected with the supporting portion 123 of the rubber frame 120. The wall 112 of the backboard 110 is at least partially located between the abutting portion 121 and the structural portion 129 of the rubber frame 120. The optical films 190 are at least partially stacked between the base 111 of the backboard 110 and the structural portion 129 of the rubber frame 120. In practical applications, the optical films 190 may include a reflective film, a light-guiding plate, a diffusing film and a brightness-enhancing film which are stacked sequentially, in which the reflective film is disposed on the base 111 of the backboard 110.

Moreover, in this embodiment, as shown in FIG. 4, the display device 100 further includes a connecting piece 150. The connecting piece 150 is coupled between the connecting surface CS and the display panel 130. To be more precise, the connecting piece 150 is coupled between the connecting surface CS and a main body 131 (to be described below) of the display panel 130. In practice, the connecting piece 150 can be a foam double-sided adhesive. However, this does not intend to limit the present disclosure.

Figure 5:
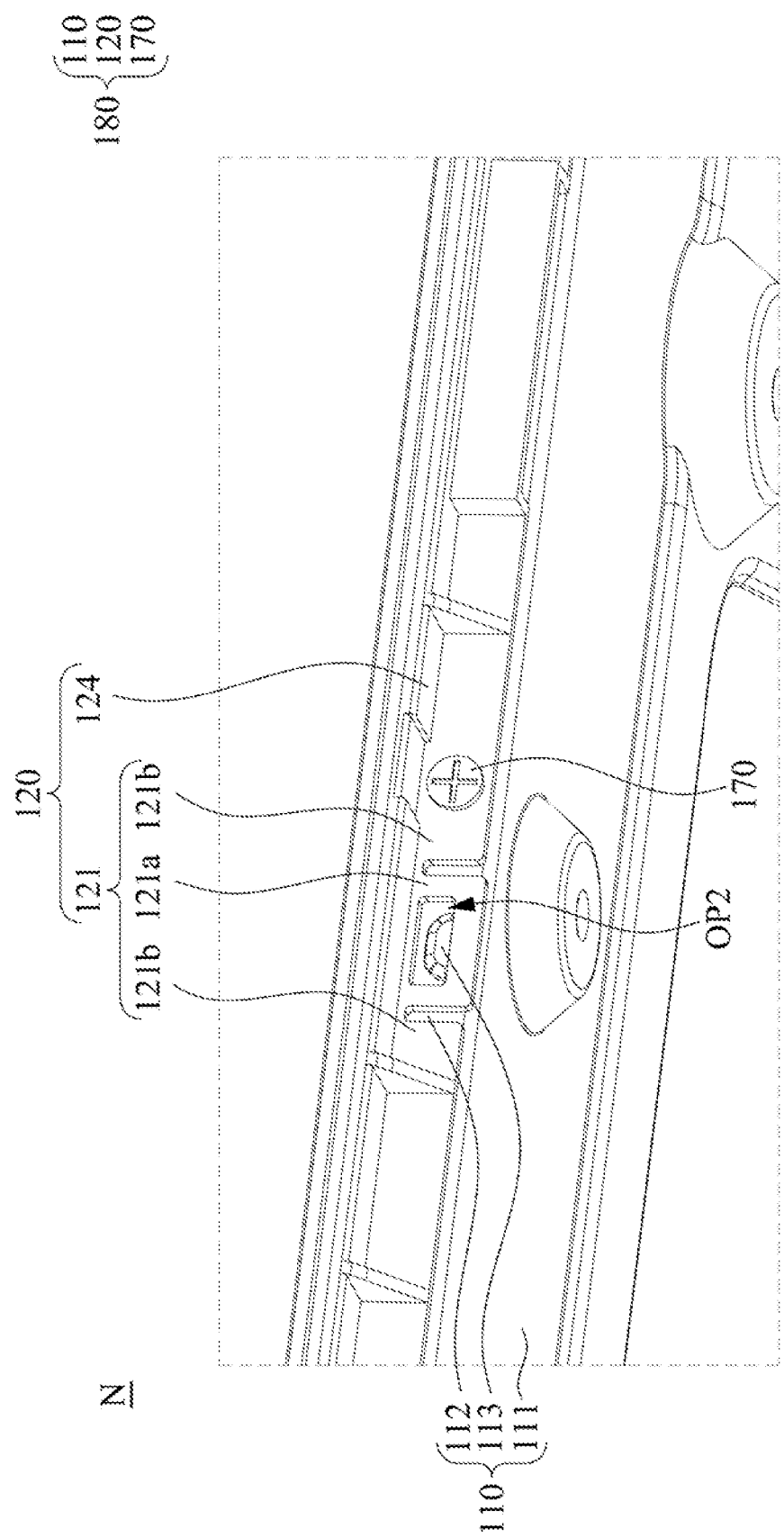
FIG. 5 is a regionally enlarged view of the zone N in FIG. 2.

Reference is made to FIG. 5. FIG. 5 is a regionally enlarged view of the zone N in FIG. 2, and the visual angle of FIG. 5 relative to FIG. 2 is slightly adjusted for clarity of description. In this embodiment, as shown in FIG. 5, the abutting portion 121 of the rubber frame 120 includes at least one first subsidiary abutting portion 121*a* and at least two second subsidiary abutting portions 121*b*. The first subsidiary abutting portion 121*a* is located between and separated from the second subsidiary abutting portions 121*b*. The first subsidiary abutting portion 121*a* has a second opening OP2. Relatively, the backboard 110 further includes a snapping portion 113. The snapping portion 113 is disposed on the wall 112 and is configured to snap at the second opening OP2. Through the snapping of the snapping portion 113 of the backboard 110 at the second opening OP2 of the first subsidiary abutting portion 121*a*, the assembly between the rubber frame 120 and the backboard 110 is facilitated. Moreover, since the first subsidiary abutting portion 121*a* is separated from adjacent two of the second subsidiary abutting portions 121*b*, in the process to snap the snapping portion 113 of the backboard 110 at the second opening OP2, the first subsidiary abutting portion 121*a* can carry out a certain amount of elastic deformation, facilitating the snapping portion 113 to snap at the second opening OP2 of the first subsidiary abutting portion 121*a*.

In addition, in this embodiment, as shown in FIG. 5, the backlight module 180 further includes at least one locking piece 170. The locking piece 170 is configured to penetrate through the wall 112 and the abutting portion 121, in order to fix the relative position between the backboard 110 and the rubber frame 120. For example, the locking piece 170 can be a combination of a screw and a nut. However, this does not intend to limit the present disclosure.

Figure 6:
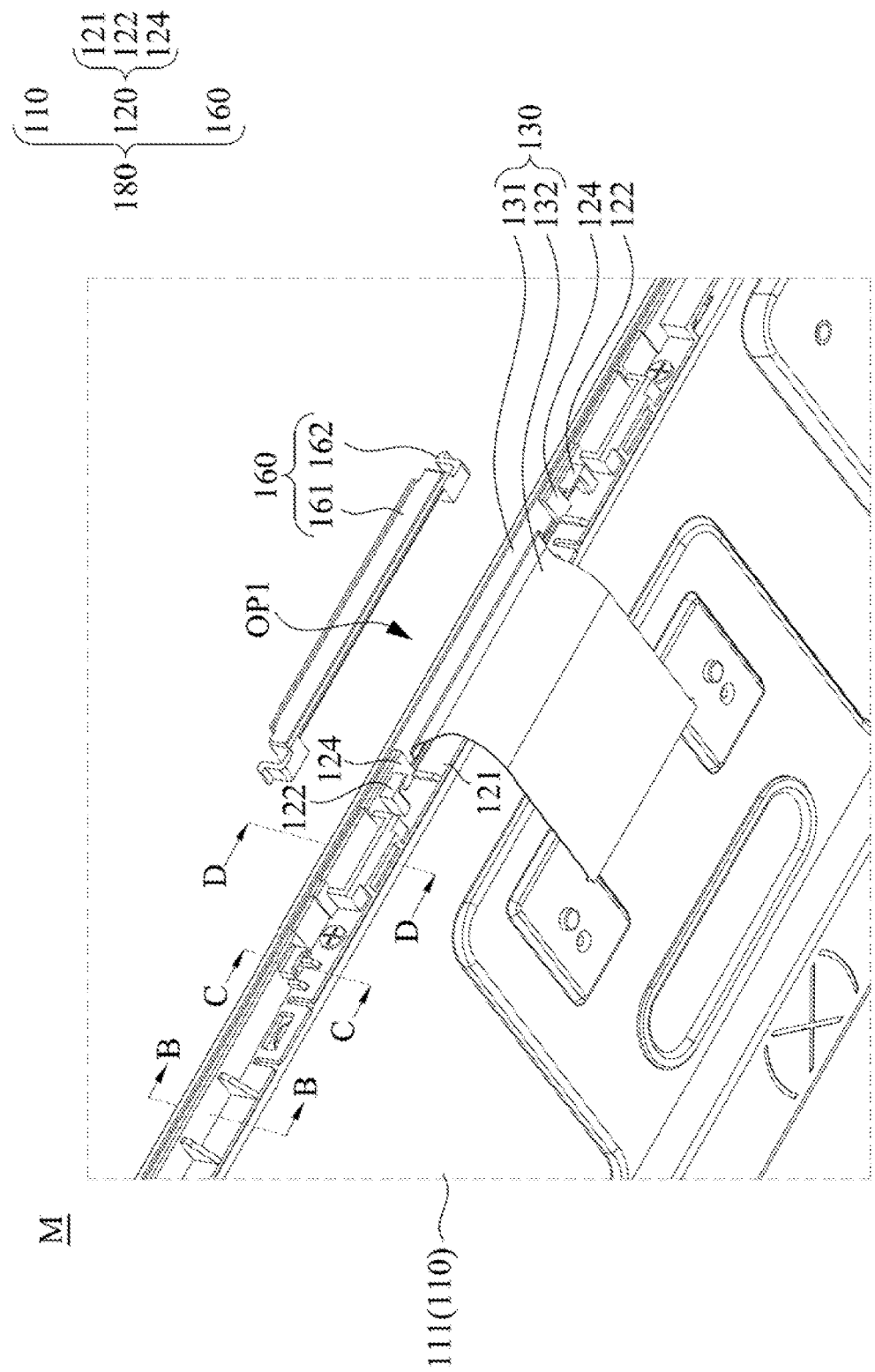
FIG. 6 is a regionally enlarged view of the zone M in FIG. 2, in which the protective cover and the rubber frame are separated from each other.

Reference is made to FIG. 6. FIG. 6 is a regionally enlarged view of the zone M in FIG. 2, in which the protective cover 160 and the rubber frame 120 are separated from each other. In this embodiment, the rubber frame 120 includes a plurality of the extending portions 124. As shown in FIG. 6, two of the extending portions 124 are separated from each other and define a first opening OP1 therebetween. Moreover, the display panel 130 includes a main body 131 and at least one touch cable 132. The touch cable 132 is coupled between the main body 131 and the backboard 110 through the first opening OP1.

Furthermore, in this embodiment, as shown in FIG. 6, the rubber frame 120 further includes at least two snapping portions 122. The snapping portions 122 are respectively disposed on a corresponding one of the extending portions 124. The touch cable 132 is at least partially located between the snapping portions 122. Moreover, the backlight module 180 further includes a protective cover 160. The protective cover 160 includes a cover body 161 and two snapping portions 162. The snapping portions 162 are disposed at two opposite ends of the cover body 161 and are configured to respectively and mutually snap with a corresponding one of the snapping portions 122. When the snapping portions 162 of the protective cover 160 respectively snap with a corresponding one of the snapping portions 122, as shown in FIG. 3, the protective cover 160 is fixed on the rubber frame 120, for protecting the touch cable 132.

Figure 7:
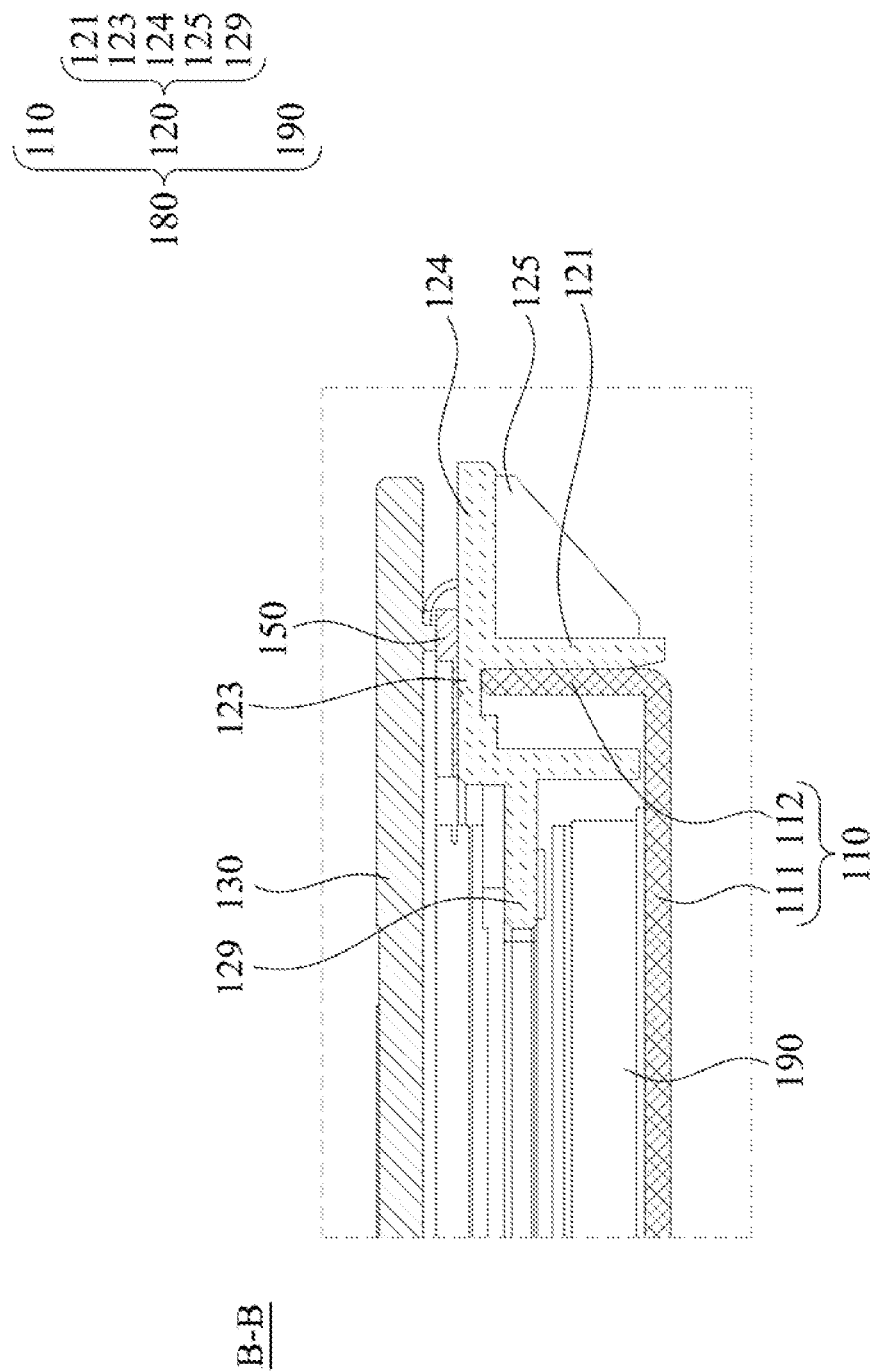
FIG. 7 is a sectional view along the sectional line B-B in FIG. 6.

Reference is made to FIG. 7. FIG. 7 is a sectional view along the sectional line B-B in FIG. 6. In this embodiment, as shown in FIG. 7, the rubber frame 120 further includes at least one stiffener 125. The stiffener 125 is perpendicularly connected with the abutting portion 121 and the extending portion 124, so as to enhance the structural strength of the rubber frame 120.

Figure 8:
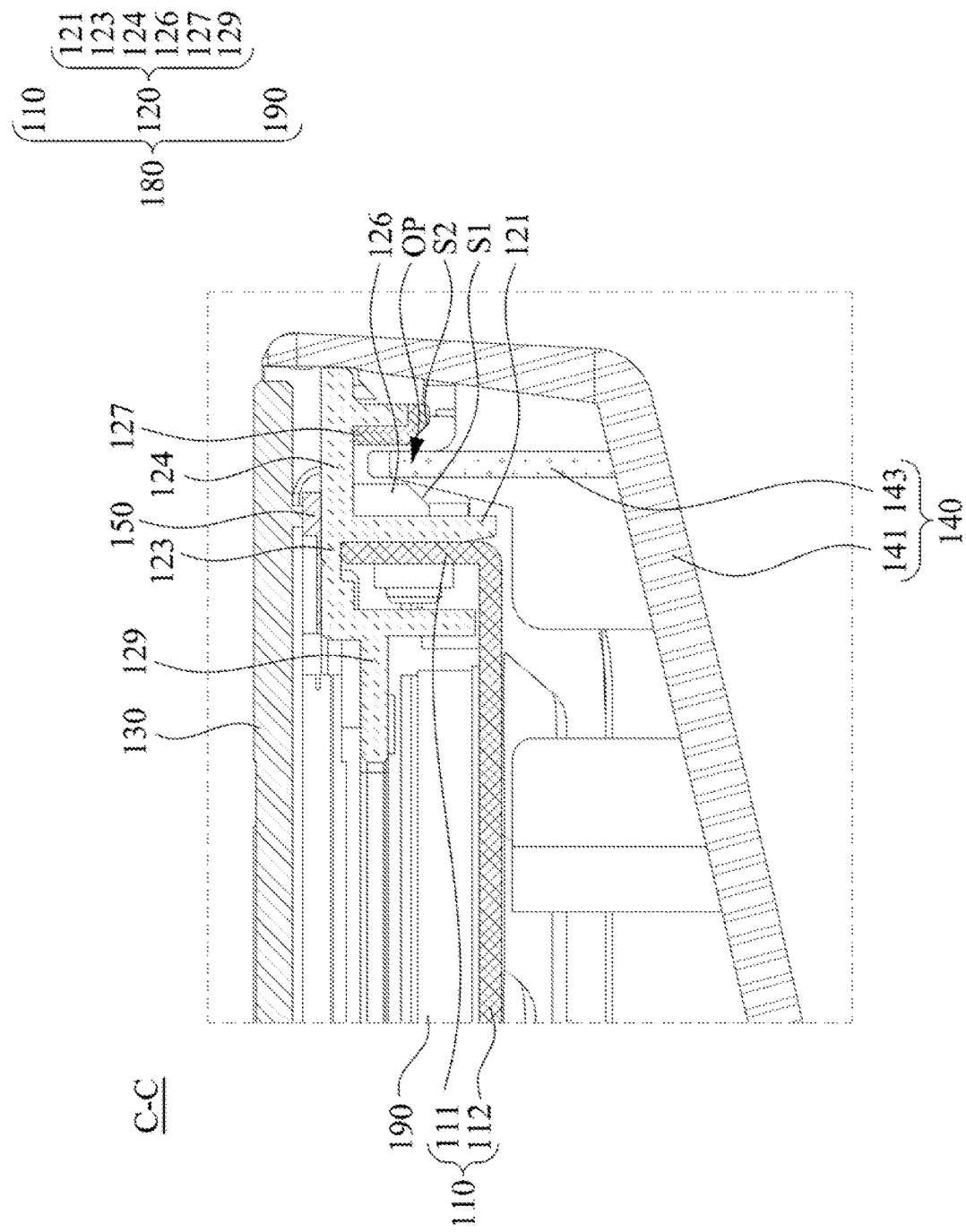
FIG. 8 is a sectional view along the sectional line C-C in FIG. 6, in which the rear casing is shown.

Reference is made to FIG. 8. FIG. 8 is a sectional view along the sectional line C-C in FIG. 6, in which the rear casing 140 is shown. In this embodiment, as shown in FIG. 8, the rubber frame 120 further includes a first guiding portion 126 and a second guiding portion 127. The first guiding portion 126 is connected with the abutting portion 121 and the extending portion 124. The first guiding portion 126 has a first inclined surface S1. The second guiding portion 127 is perpendicularly connected with the extending portion 124. The second guiding portion 127 at least partially aligns with and is separated from the first guiding portion 126. The second guiding portion 127 has a second inclined surface S2. The first inclined surface S1 and the second inclined surface S2 define together an opening OP therebetween. Correspondingly, the rear casing 140 further includes a casing body 141 and a third guiding portion 143. The third guiding portion 143 is connected with the casing body 141 and is configured to penetrate through the opening OP. Therefore, when the rear casing 140 is assembled to the rubber frame 120, the first guiding portion 126 and the second guiding portion 127 can provide guidance to the rear casing 140.

Figure 9:
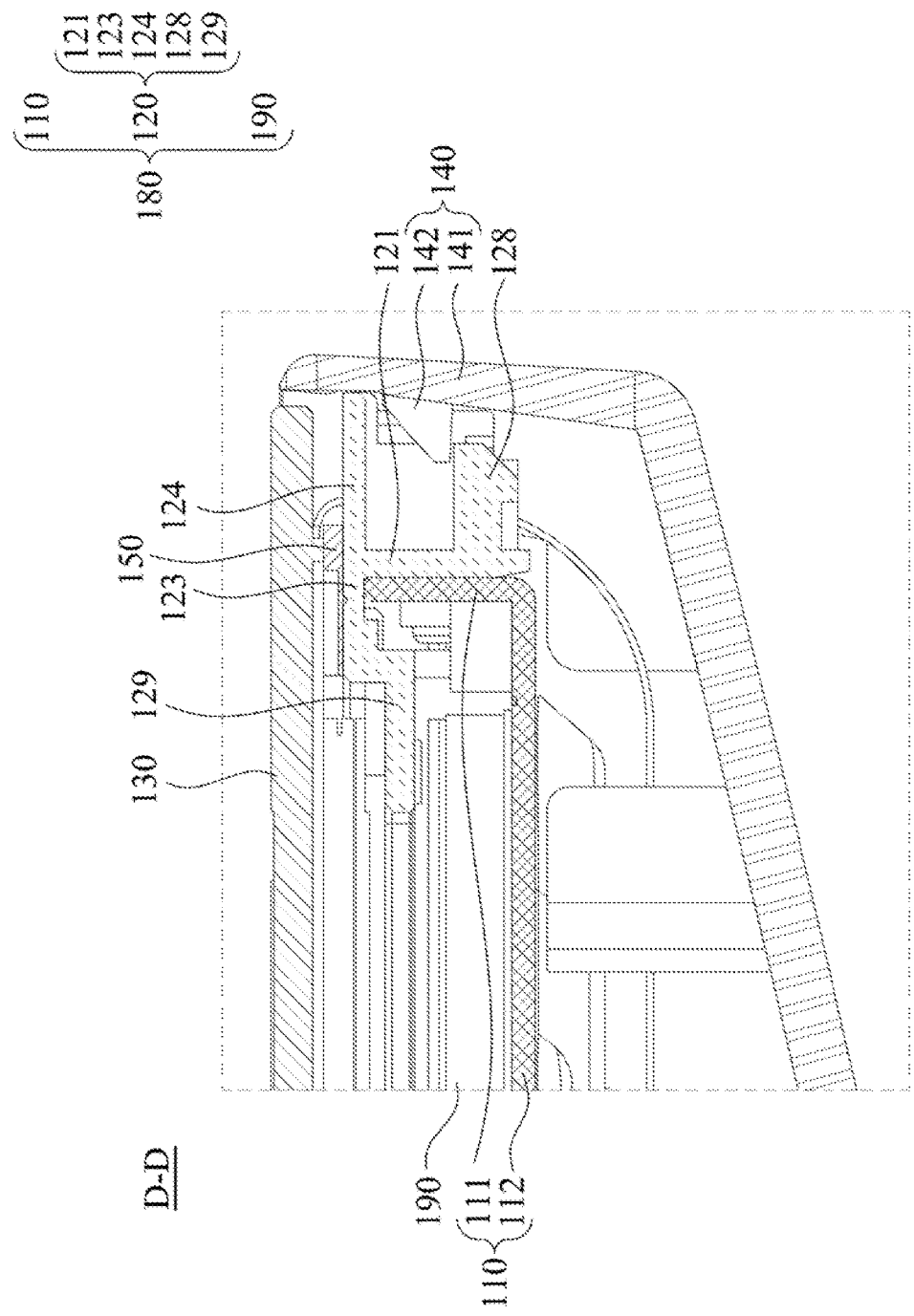
FIG. 9 is a sectional view along the sectional line D-D in FIG. 6, in which the rear casing is shown.

Reference is made to FIG. 9. FIG. 9 is a sectional view along the sectional line D-D in FIG. 6, in which the rear casing 140 is shown. In this embodiment, as shown in FIG. 9, the rubber frame 120 further includes a snapping portion 128. The snapping portion 128 is disposed at a side of the abutting portion 121 away from the wall 112. The snapping portion 128 and the extending portion 124 are separated from each other. Moreover, the rear casing 140 includes a snapping portion 142 connected with the casing body 141.

The backboard 110 is located between the display panel 130 and the casing body 141. The snapping portion 142 is located between the snapping portion 128 and the extending portion 124. The snapping portion 142 is configured to snap with the snapping portion 128, in order to fix the relative position between the rear casing 140 and the rubber frame 120.

In conclusion, the aforementioned embodiments of the present disclosure have at least the following advantages: since the extending portion of the rubber frame extends toward outside from the backboard to an outside of the backboard and the edge of the extending portion substantially aligns with or exceeds relative to the wall the edge of the display panel, the extending portion can provide protection to the display panel. Thus, the display panel is avoided from being touched directly by workers, and the risk of the display panel to be directly collided is also reduced. In this way, the production yield of the display device is effectively improved.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A display device, comprising:
   a backboard comprising a base and a wall, the wall having a first end and a second end opposite to the first end, the first end connecting with an edge of the base;
   a rubber frame comprising:
      an abutting portion being located outside the backboard and abutting against the wall;
      a supporting portion connecting with the abutting portion and being supported at the second end;
      an extending portion connecting with the abutting portion and extending toward outside from the backboard, the extending portion and the supporting portion being at least partially coplanar to define a connecting surface;
      at least one first guiding portion connecting with the abutting portion and the extending portion, the first guiding portion having a first inclined surface; and
      at least one second guiding portion perpendicularly connecting with the extending portion, the second guiding portion at least partially aligning with and being separated from the first guiding portion, the second guiding portion having a second inclined surface, the first inclined surface and the second inclined surface defining together an opening therebetween;
   a display panel coupled with the connecting surface, wherein an edge of the extending portion substantially aligns with or exceeds relative to an edge of the display panel; and
   a rear casing comprising a casing body and a third guiding portion connected with the casing body, the third guiding portion being configured to penetrate through the opening.

2. The display device of claim 1, wherein the edge of extending portion being away from the abutting portion has a first perpendicular distance relative to the wall, the edge of the display panel has a second perpendicular distance relative to the wall, the first perpendicular distance is longer than or equal to the second perpendicular distance.

3. The display device of claim 1, wherein the rubber frame further comprises:
   at least one stiffener perpendicularly connected with the abutting portion and the extending portion.

4. The display device of claim 1, further comprising:
   a connecting piece coupled between the connecting surface and the display panel.

5. The display device of claim 1, wherein the rubber frame further comprises: at least one first snapping portion disposed at a side of the abutting portion away from the wall, the rear casing further comprises: a second snapping portion connected with the casing body, the backboard is located between the display panel and the casing body, the second snapping portion is configured to snap with the first snapping portion.

6. A display device, comprising: a display panel comprising a main body and at least one touch cable; and a backlight module coupled with the display panel, the backlight module comprising: a plurality of extending portions, an edge of each of the extending portions substantially aligning with or exceeding an edge of the display panel; a backboard comprising a base and a wall, the wall having a first end and a second end opposite to the first end, the first end connecting with an edge of the base; a rubber frame comprising: an abutting portion being located outside the backboard and abutting against the wall; a supporting portion being connected with the abutting portion and supported at the second end; and a structural portion being connected with the supporting portion, the wall being at least partially located between the abutting portion and the structural portion, wherein the extending portions respectively connect with the abutting portion and extend toward an outside from the backboard, the extending portions are separated from each other and define a first opening therebetween, the touch cable is coupled between the main body and the backboard through the first opening, each of the extending portions and the supporting portion are at least partially coplanar to define a connecting surface, the display panel is coupled with the connecting surface; and a plurality of optical films at least partially stacked between the base and the structural portion.

7. The display device of claim 6, wherein the edge of each of the extending portions being away from a corresponding one of the abutting portions has a first perpendicular distance relative to the wall, the edge of the display panel has a second perpendicular distance relative to the wall, each of the first perpendicular distances is longer than or equal to the second perpendicular distance.

8. The display device of claim 6, wherein the rubber frame further comprises at least two first snapping portions respectively disposed on a corresponding one of the extending portions, the touch cable is at least partially located between the first snapping portions, the backlight module further comprises: a protective cover comprising a cover body and two second snapping portions, the second snapping portions are disposed at two opposite ends of the cover body for mutually snapping with a corresponding one of the first snapping portions.

9. The display device of claim 6, wherein the abutting portion comprises at least one first subsidiary abutting portion and at least two second subsidiary abutting portions, the first subsidiary abutting portion is located between and separated from the second subsidiary abutting portions, the first subsidiary abutting portion has a second opening, the backboard further comprises a third snapping portion disposed on the wall for snapping at the second opening.

10. The display device of claim 6, wherein the backlight module further comprises: at least one locking piece configured to penetrate through the wall and the abutting portion.

11. The display device of claim 10, wherein the locking piece is a combination of a screw and a nut.

* * * * *